Figure 1:
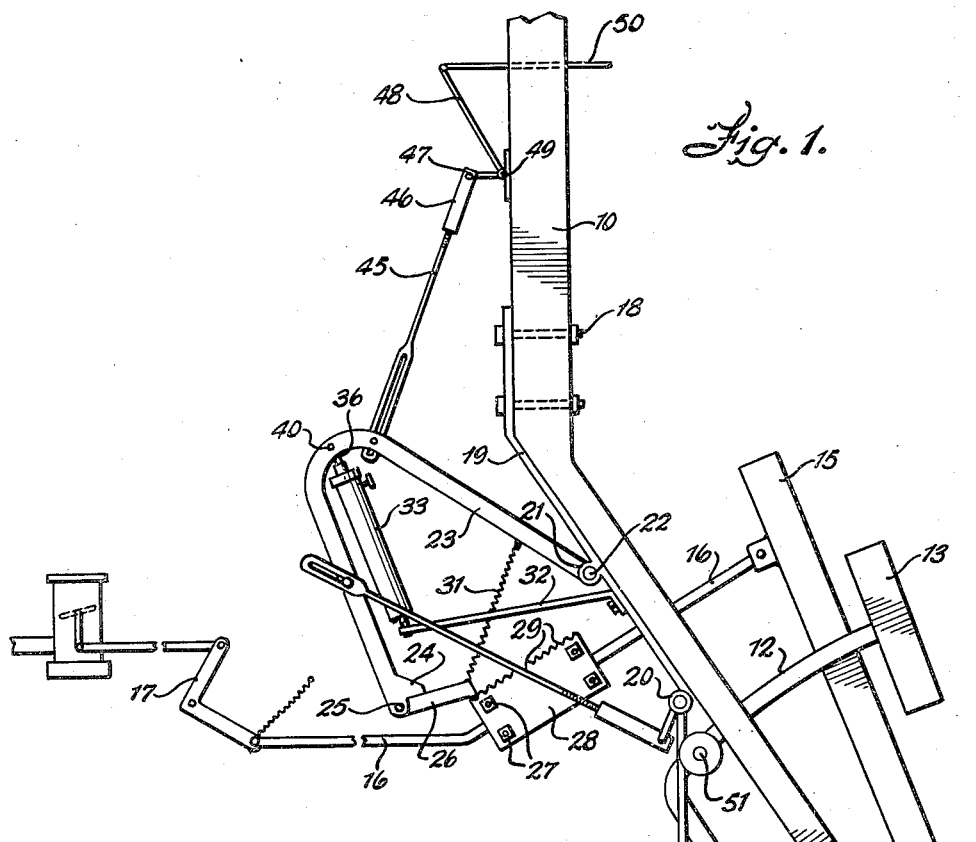

Dec. 6, 1949　　　F. P. RODKEY　　　2,490,473
ACCELERATOR ROD DETENT

Filed Oct. 22, 1946　　　3 Sheets-Sheet 1

Inventor
Franklin P. Rodkey.

By Clarence A. O'Brien
and Harvey B. Jacobson
Attorneys

Dec. 6, 1949     F. P. RODKEY     2,490,473
ACCELERATOR ROD DETENT
Filed Oct. 22, 1946     3 Sheets-Sheet 2
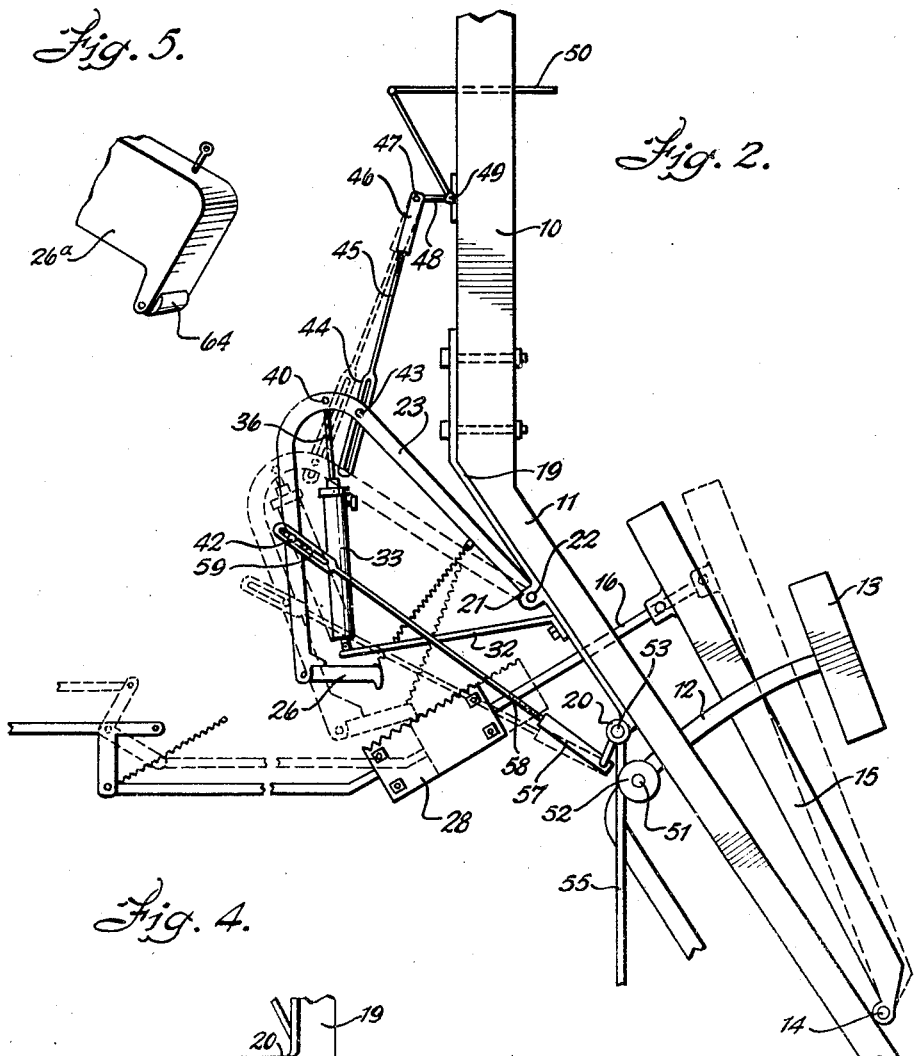
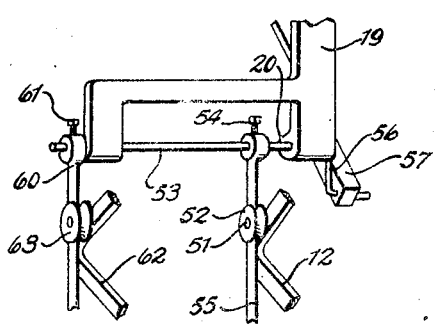
Inventor
Franklin P. Rodkey.
By Clarence A. O'Brien
and Harvey B. Jacobson
Attorneys Dec. 6, 1949 F. P. RODKEY 2,490,473
ACCELERATOR ROD DETENT
Filed Oct. 22, 1946 3 Sheets-Sheet 3
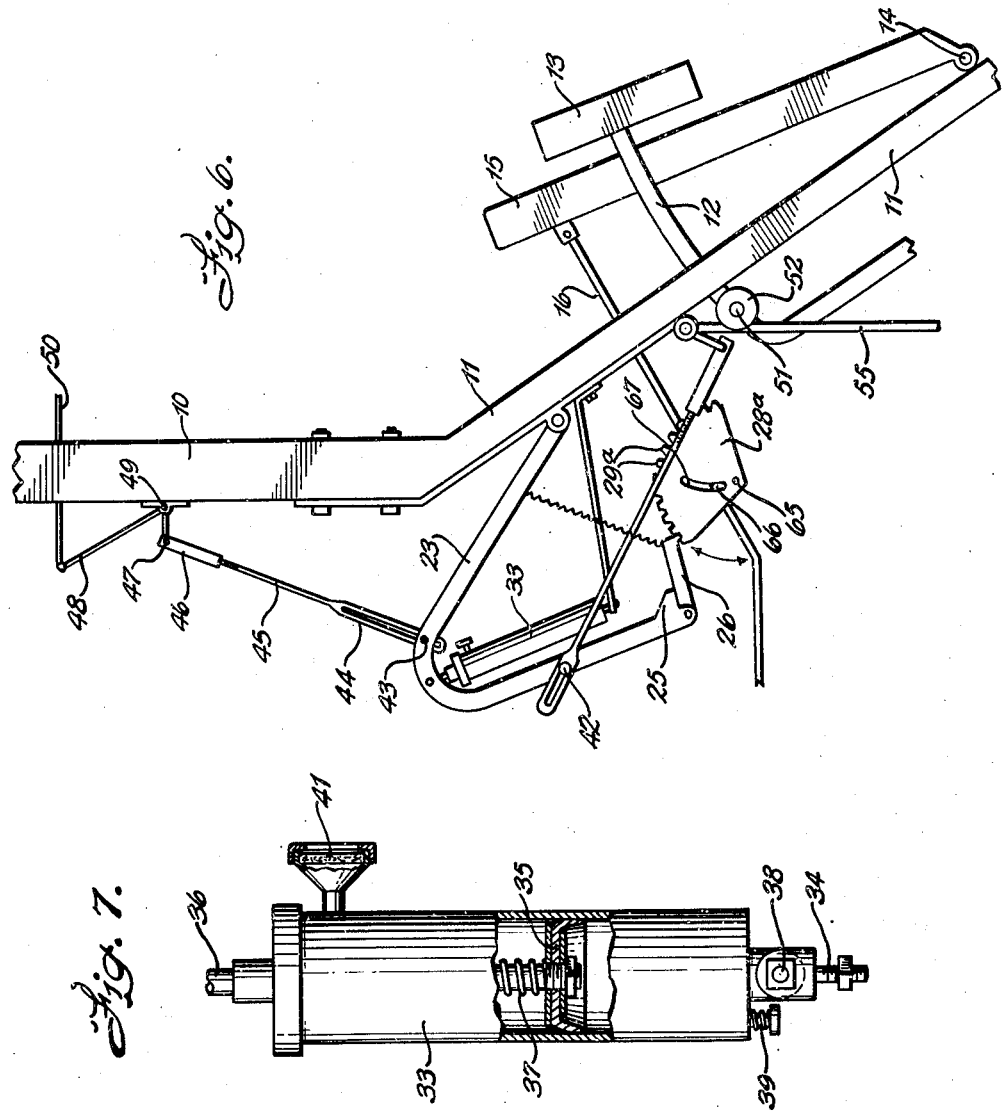
Inventor
Franklin P. Rodkey.
By Clarence A. O'Brien
and Harvey B. Jacobson
Attorneys Patented Dec. 6, 1949

2,490,473

UNITED STATES PATENT OFFICE 2,490,473

ACCELERATOR ROD DETENT

Franklin P. Rodkey, Delphi, Ind.

Application October 22, 1946, Serial No. 704,904

9 Claims. (Cl. 192—3)

This invention relates to a detent and has for its primary object to retain a yieldingly retracted longitudinally movable control rod against retraction.

Another object is to release the control rod upon its advance to permit adjustment thereof, and automatically to retain the control rod in a newly adjusted position.

A further and more specific object is to latch the accelerator of a motor driven vehicle in a desired position to hold the speed of travel of the vehicle at a predetermined rate.

A still further and more specific object of the invention is automatically to release the detent with the application of the brakes or clutch of the vehicle, and also to enable the detent to be released and thrown out of operation when conditions are such that the driver prefers to have the vehicle under normal control.

The above and other objects may be attained by employing this invention which embodies among its features a transversely toothed member movable in unison with the control rod or accelerator rod of a motor vehicle, a lever mounted above the control rod to swing toward and away from the toothed member, yielding means to advance the lever toward the toothed member, a dog pivoted to the lever for engagement with a tooth on the toothed member to hold the control rod against retraction and cause the lever to recede from the toothed member when the control rod is advanced.

Other features include means to retard the movement of the lever toward the control rod, manually actuated means to elevate the lever and hold the dog out of engagement with the toothed member, and means actuated upon the application of the brakes or disengagement of the clutch of a motor vehicle automatically to disengage the dog from its engagement with the toothed member.

Figure 3:
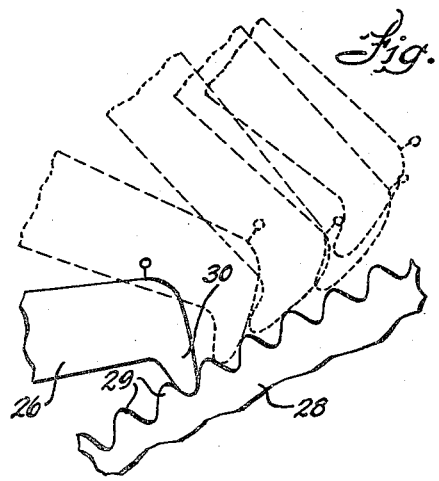

In the drawings,

Figure 1 is a sectional view through a floorboard and dashboard of a vehicle illustrating the application of this invention to the accelerator and brake pedal, Figure 2 is a view similar to Figure 1 illustrating in full lines the disengagement of the dog from the toothed plate carried by the control rod, Figure 3 is an enlarged side view of the toothed edge of the toothed member and the latch dog, Figure 4 is a fragmentary view illustrating the manner in which a brake pedal actuates the detent disengaging device, Figure 5 is a fragmentary perspective view of a modified form of latch dog, Figure 6 is a view similar to Figures 1 and 2 illustrating a modified form of toothed member, and Figure 7 is a side view partially in section of the lever retarding cylinder.

Referring to the drawings in detail, a dashboard 10 of a conventional motor vehicle is joined to the conventional upwardly and forwardly inclined floorboard 11 through which a brake lever 12 operates in a conventional manner. The brake lever 12 is equipped with a conventional brake pedal 13 and pivotally mounted as at 14 to the floorboard near the brake pedal is a conventional accelerator pedal 15 to which is connected in a conventional manner an accelerator rod 16 which leads to suitable conventional mechanism 17 for controlling the feeding of fuel to the engine of vehicle.

Bolted or otherwise attached as at 18 to the dashboard 10 and floorboard 11 is a bracket 19 carrying adjacent its lower end a bearing 20 the purpose of which will be more fully hereinafter explained. Carried on the underside of the bracket intermediate its ends is a bearing 21 to which is pivotally supported by a pivot 22, an inverted U-shaped lever 23 the opposite or free end of which is provided with a stop 24 and a pair of depending ears for the support of a pivot 25 to which a dog 26 is pivotally connected. Clamped as by U-bolts 27 to the control rod 16 is a transversely toothed member 28 the teeth 29 of which are adapted to be engaged by the tongue 30 carried at the free end of the dog 26. As illustrated, the dog 26 is yieldingly held against a stop 24 by a retractile coil spring 31 so that when the lever 23 swings about its pivot 22 the dog 26 will be lifted away from the toothed plate 28, as illustrated in Figure 2. It is also to be noted that the pivotal connection 25 between the dog 26 and lever 23 is such that when the rod 16 is advanced by pressure on the pedal 15 the free end of the lever will be swung upwardly by the rocking of the dog 26 about the pivot 25 until such time as the tongue 30 on the dog 26 rides out of restraining position against the teeth 29 as suggested by the dotted lines in Figure 3. As soon as the tongue 30 completely disengages the teeth 29 of the toothed member 28 the spring 31 will snap the dog into the position illustrated in the full lines in Figures 1 and 2 against the stop 24.

The lever 23 is advanced about the pivot 22 to bring the dog 26 into contact with the teeth 29, and in order to retard such advance for a period of time sufficient to permit the position of the rod 16 to be adjusted, I provide adjacent the bearing 21 on the bracket 19 a bracket 32 which extends toward the free end of the lever 23. The lower end of a cylinder 33 (Fig. 7) is pivoted as at 38 to a mounting stud 34 carried adjacent the free end of the bracket 32, and slidably mounted within the cylinder is a piston 35 to which an upwardly extending piston rod 36 is connected. This rod 36 extends through the upper head of the cylinder 33, and surrounding the rod between the upper head and the piston is a compression coil spring 37 which normally urges the piston toward the bottom of the cylinder. The piston 35 is so constructed that when it is moved upwardly in the cylinder, air will enter the portion of the cylinder below the piston around the peripheral edge thereof, but when the piston is advanced into the cylinder the air therein will be retained. In order to permit the escape of air from the lower end of the cylinder I provide a needle valve 39 of conventional form, the orifice of which is subject to extremely close regulation. It will thus be seen that the return of the piston 35 to lowered position under the influence of the spring 37 will be governed by the rapidity with which the air may be discharged from the cylinder through the needle valve. The upper end of the piston rod 36 is pivotally connected as at 40 to the bight portion of the lever 23 so that as the lever is moved upwardly about its pivot 22 the piston rod will be withdrawn as illustrated in Figure 2. A suitable breather 41 is connected to the cylinder 33 above the piston 35 to permit the easy intake and discharge of air from the cylinder above the piston.

As illustrated in the drawings, the lever 23 is provided with a pair of spaced laterally extending lugs 42 and 43 to the latter of which is connected the slotted end 44 of a pull rod 45. The upper end of the pull rod is threaded for adjustment into a sleeve 46, the upper end of which is pivotally connected as at 47 to a bell crank lever 48 pivoted at 49 to the dashboard 10. The arm of the bellcrank lever 48 opposite that which is pivoted to the sleeve 46 has connected thereto a push rod 50 which operates through a suitable opening in the dashboard and is equipped with a control knob (not shown) which is located within easy reach of the driver of the vehicle. By exerting pull on the rod 50 it will be obvious that the bellcrank 48 will be rotated so as to cause the slotted end 44 of the rod 45 to exert pull on the lug 43 and elevate the lever 23 to disengage the dog from the toothed member 28 when it is desired to operate the vehicle in a normal manner.

In order to disengage the dog 26 from the toothed member 28 and to permit the accelerator rod 16 to return to retracted position upon the application of the brakes of the vehicle, I attach as by a stud 51 to the brake lever 12 a roller 52, and pivotally supported in the bearings 20 of the plate 19 is a horizontally extending rod 53 to which is adjustably secured as by a set-screw 54 a depending arm 55 which is adapted to engage the roller 52 so that when the brake pedal 13 is depressed, the rod 53 will rock in its bearings 20. Carried at one end of the rod 53 is a crank-arm 56 to which is pivotally connected one end of a sleeve 57 into the opposite end of which threaded a push rod 58. The end of the push rod 58 opposite that entering the sleeve 57 is provided with an elongated slot 59 in which the stud 42 is received. It will thus be seen that when the brake pedal 13 is depressed, the rod 53 will be rocked to cause the crank-arm 56 to advance the rod 58 so that when the stud 42 encounters the end of the slot 59, the lever 23 will be moved upwardly about its pivot 22 to thus disengage the dog 26 from the teeth 29 of the toothed member 28 so as to permit the accelerator pedal and accelerator rod to return to its normal retracted position. Obviously, if so desired, an arm 60 may also be connected to the shaft 53 for adjustment as by a setscrew 61, and attached to the clutch pedal 62 of the vehicle is a roller 63 which is adapted to ride against the arm 60 so as to cause the shaft 53 to rock when the clutch pedal is depressed and thereby to disengage the dog 26 from the toothed member 28. It will thus be seen that the accelerator rod may automatically return to its retracted position when either the clutch or the brake pedal is depressed.

In Figure 5, I have illustrated a modified form of dog designated 26a carrying at the end which engages the teeth 29 a roller 64 which will facilitate the entrance of the dog between the teeth and its extraction therefrom.

In the modification illustrated in Figure 6, the parts are essentially the same as those previously described with the exception of the transversely toothed member which in the present form, takes the shape of a segmental plate 28a pivoted as at 65 to swing about an axis which extends transversely of the longitudinal movement of the accelerator rod 16. Carried by the accelerator rod is a laterally extending stud 66 which projects through an arcuate slot 67 on the plate 28a so that when the accelerator rod 16 moves longitudinally, the plate 28a will swing about its pivot 65 so as to bring the teeth 29a on its curved surface into engagement with the tongue on the dog 26, in order to lock the accelerator rod 16 against retraction under the influence of its retracting means.

In operation, it will be understood that as the driver of the vehicle exerts pressure on the accelerator pedal, the dog 26 will exert pressure against the end of the lever to cause it to swing about a pivot 22. Such movement will extend the piston rod 36 against the compression of the spring 37, thus drawing air into the lower end of the cylinder 33 around the piston. As soon as the tongue 30 reaches a point on the teeth 29 of the toothed member 28 where it is extracted from its position between the teeth, the spring 31 will snap the dog back against the stop 24, thus freeing the accelerator rod 16. The driver adjusts the speed to suit his desires and by reason of the escape of the air from the cylinder 33 through the valve 39, the lever 23 will return to its lowered position, thus causing the tongue 30 to enter between the teeth 29 in a detaining position. In this way, the speed at which a vehicle is propelled along a roadway may be maintained without requiring that pressure be exerted on the accelerator pedal by the driver.

While in the foregoing there has been shown and described the preferred embodiment of this invention it is to be understood that minor changes in the details of construction, combination and arrangement of parts may be resorted to without departing from the spirit and scope of the invention as claimed.

I claim as my invention:

1. A detent for a yieldingly retracted longitudinally movable control rod, which includes a transversely toothed member movable in unison with the control rod, a lever mounted above the control rod to swing toward the toothed member, a dog pivoted to the lever for engagement with a tooth on the toothed member to hold the control rod against retraction and cause the lever to recede from the toothed member when the control rod is advanced, yielding means connected to the lever to advance the dog into engagement with a tooth on the toothed member, and means mounted adjacent and connected to the lever to retard the movement of the lever toward the control rod.

2. A detent for a yieldingly retracted longitudinally movable control rod, which includes a transversely toothed member movable in unison with the control rod, a lever mounted above the control rod to swing toward the toothed member, a dog pivoted to the lever for engagement with a tooth on the toothed member to hold the control rod against retraction and cause the lever to recede from the toothed member when the control rod is advanced, yielding means connected to the lever to advance the dog into engagement with a tooth on the toothed member, a stop on the lever to arrest movement of the dog toward the lever, and means mounted adjacent and connected to the lever to retard the movement of the lever toward the control rod.

3. A detent for a yieldingly retracted longitudinally movable control rod, which includes a transversely toothed member movable in unison with the control rod, a lever mounted above the control rod to swing toward the toothed member, a dog pivoted to the lever for engagement with a tooth on the toothed member to hold the control rod against retraction and cause the lever to recede from the toothed member when the control rod is advanced, yielding means connected to the lever to advance the dog into engagement with a tooth on the toothed member, a stop on the lever to arrest movement of the dog toward the lever, means yieldingly to hold the dog against the stop, and means mounted adjacent and connected to the lever to retard the movement of the lever toward the toothed member.

4. A detent for a yieldingly retracted longitudinally movable control rod, which includes a transversely toothed member movable in unison with the control rod, a lever mounted above the control rod to swing toward the toothed member, a dog pivoted to the lever for engagement with a tooth on the toothed member to hold the control rod against retraction and cause the lever to recede from the toothed member when the control rod is advanced, yielding means connected to the lever to advance the dog into engagement with a tooth on the toothed member, means mounted adjacent and connected to the lever to retard the movement of the lever toward the control rod, and manually actuated means to elevate the lever and hold the dog out of engagement with the toothed member.

5. A detent for a yieldingly retracted longitudinally movable control rod, which includes a transversely toothed member movable in unison with the control rod, a lever mounted above the control rod to swing toward the toothed member, a dog pivoted to the lever for engagement with a tooth on the toothed member to hold the control rod against retraction and cause the lever to recede from the toothed member when the control rod is advanced, yielding means connected to the lever to advance the dog into engagement with a tooth on the toothed member, a stop on the lever to arrest movement of the dog toward the lever, means mounted adjacent and connected to the lever to retard the movement of the lever toward the control rod and manually actuated means to elevate the lever and hold the dog out of engagement with the toothed member.

6. A detent for a yieldingly retracted longitudinally movable control rod, which includes a transversely toothed member movable in unison with the control rod, a lever mounted above the control rod to swing toward the toothed member, a dog pivoted to the lever for engagement with a tooth on the toothed member to hold the control rod against retraction and cause the lever to recede from the toothed member when the control rod is advanced, yielding means connected to the lever to advance the dog into engagement with a tooth on the toothed member, a stop on the lever to arrest movement of the dog toward the lever, means yieldingly to hold the dog against the stop, means mounted adjacent and connected to the lever to retard the movement of the lever toward the toothed member, and manually actuated means to elevate the lever and hold the dog out of engagement with the toothed member.

7. The combination with a motor driven vehicle having a yieldingly retracted longitudinally movable accelerator rod, of a detent for holding said rod against retraction comprising a transversely toothed member carried by and movable in unison with the accelerator rod, a lever mounted above said accelerator rod to swing in a vertical arc toward the toothed member, a dog pivoted to the lever for engagement with a tooth on the toothed member to hold the accelerator rod against retraction and to cause the lever to recede from the toothed member when the accelerator rod is advanced and yielding means connected to the lever to advance the dog into engagement with a tooth on the toothed member.

8. The combination with a motor driven vehicle having a yieldingly retracted longitudinally movable accelerator rod, of a detent for holding said rod against retraction comprising a transversely toothed member carried by and movable in unison with the accelerator rod, a lever mounted above said accelerator rod to swing toward the toothed member, a dog pivoted to the lever for engagement with a tooth on the toothed member to hold the accelerator rod against retraction and to cause the lever to recede from the toothed member when the accelerator rod is advanced, yielding means connected to the lever to advance the dog into engagement with a tooth on the toothed member, and manually actuated means to elevate the lever and hold the dog out of engagement with the toothed member whereby the accelerator rod may function in a normal manner.

9. The combination with a motor driven vehicle having a yieldingly retracted longitudinally movable accelerator rod, and a foot actuated brake lever, of a detent for holding said rod against retraction comprising a transversely toothed member carried by and movable in unison with the accelerator rod, a lever mounted above said accelerator rod to swing in a vertical arc toward the toothed member, a dog pivoted to the lever for engagement with a tooth on the toothed member to hold the accelerator rod against retraction and to cause the lever to recede from the accelerator rod when the rod is advanced, yielding means connected to the lever to advance the dog into engagement with a tooth on the toothed member, and means actuated by pressure on the brake lever to elevate the lever and hold the dog out of engagement with the toothed member whereby the accelerator rod may move under the influence of its retracting means.

FRANKLIN P. RODKEY.

REFERENCES CITED

The following references are of record in the file of this patent:

UNITED STATES PATENTS

| Number | Name | Date |
|---|---|---|
| 1,927,209 | Gilmore | Sept. 19, 1933 |